United States Patent
McBride et al.

(10) Patent No.: US 10,552,245 B2
(45) Date of Patent: Feb. 4, 2020

(54) CALL HOME MESSAGE CONTAINING BUNDLED DIAGNOSTIC DATA

(71) Applicant: International Business Machines Corporation, Armonk, NY (US)

(72) Inventors: Gregory E. McBride, Vail, AZ (US); Dash D. Miller, St. Louis Park, MN (US); Miguel A. Perez, Miami, FL (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/602,857

(22) Filed: May 23, 2017

(65) Prior Publication Data

US 2018/0341540 A1    Nov. 29, 2018

(51) Int. Cl.
*G06F 11/07* (2006.01)

(52) U.S. Cl.
CPC ...... *G06F 11/0784* (2013.01); *G06F 11/0709* (2013.01); *G06F 11/0727* (2013.01); *G06F 11/0778* (2013.01)

(58) Field of Classification Search
CPC ............. G06F 11/0784; G06F 11/0709; G06F 11/0727; G06F 11/0751; G06F 11/0778
USPC ........................................................ 714/57
See application file for complete search history.

(56) References Cited

U.S. PATENT DOCUMENTS

| | | | |
|---|---|---|---|
| 5,619,644 A | 4/1997 | Crockett et al. | |
| 6,636,908 B1 * | 10/2003 | Winokur | G06F 13/122 709/233 |
| 7,818,472 B2 | 10/2010 | Kalos et al. | |
| 8,468,006 B2 | 6/2013 | Casteres et al. | |
| 8,832,654 B2 | 9/2014 | Malnati | |
| 9,489,217 B2 | 11/2016 | Komarov et al. | |
| 2005/0076052 A1 * | 4/2005 | Kojima | G06Q 30/06 |
| 2005/0144436 A1 | 6/2005 | Chen et al. | |
| 2012/0117370 A1 | 5/2012 | Saretto et al. | |
| 2012/0221884 A1 | 8/2012 | Carter et al. | |
| 2012/0239981 A1 | 9/2012 | Franke et al. | |
| 2013/0332922 A1 | 12/2013 | Entezari et al. | |
| 2014/0351655 A1 * | 11/2014 | Malinowski | G06F 11/0778 714/45 |
| 2017/0286205 A1 * | 10/2017 | Jeong | G06F 3/0619 |
| 2018/0097711 A1 * | 4/2018 | Nallabothula | H04L 43/0811 |

\* cited by examiner

*Primary Examiner* — Matthew M Kim
*Assistant Examiner* — Indranil Chowdhury
(74) *Attorney, Agent, or Firm* — Nelson and Nelson; Daniel P. Nelson; Alexis V. Nelson

(57) ABSTRACT

A method for collecting diagnostic information associated with an error is disclosed. In one embodiment, such a method includes detecting an error at one of a storage system and a host system coupled to the storage system. In response, the host system gathers software-related diagnostic information related to the error and sends the software-related diagnostic information to the storage system. Meanwhile, the storage system gathers hardware-related diagnostic information related to the error. Once the storage system obtains both software-related diagnostic information and hardware-related diagnostic information, the storage system bundles the information together and sends it to a service provider using a "call home" function. A corresponding system and computer program product are also disclosed.

20 Claims, 7 Drawing Sheets

CALL HOME MESSAGE CONTAINING BUNDLED DIAGNOSTIC DATA

BACKGROUND

Field of the Invention

This invention relates to systems and methods for collecting diagnostic information associated with an error.

Background of the Invention

Data is increasingly one of an organization's most valuable assets. Accordingly, it is paramount that an organization protect its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate policies and procedures to prevent such losses from occurring.

Because of the value of an organization's data, it is important that service providers such as in-house technicians and third-party service personnel are alerted when problems or issues occur with storage systems that contain data. For this reason, some storage system vendors have developed notification systems to notify service providers when problems or issues occur. For example, IBM storage systems such as IBM San Volume Controller (SVC) and IBM Storwize have a "call home" feature that generates and sends a message to a service provider when a problem or issue occurs on the storage system. These messages may contain detailed information about a problem such as a system log providing context to the problem, time and date the problem occurred, and type of problem that was detected.

Unfortunately, some errors may require gathering diagnostic information not only from a storage system, but also from a host system that accesses data on the storage system. Typically, this information is gathered and analyzed independently in order to diagnose the root cause of an error. When gathered in this manner, there can be differences in time when the information is collected on the host system and storage system. Information is often collected on one system without doing so on the other, leaving an incomplete picture of events and making it difficult to determine the root cause of the error.

In view of the foregoing, what are needed are systems and methods to more effectively collect diagnostic information associated with an error. Ideally such systems and methods will enable information to be collected on both the host system and storage system with similar timing. Further needed are systems and methods to more fully leverage "call home" capability provided by the storage system.

SUMMARY

The invention has been developed in response to the present state of the art and, in particular, in response to the problems and needs in the art that have not yet been fully solved by currently available systems and methods. Accordingly, the invention has been developed to provide systems and methods to more efficiently collect diagnostic information associated with an error. The features and advantages of the invention will become more fully apparent from the following description and appended claims, or may be learned by practice of the invention as set forth hereinafter.

Consistent with the foregoing, a method for collecting diagnostic information associated with an error is disclosed. In one embodiment, such a method includes detecting an error at one of a storage system and a host system coupled to the storage system. In response, the host system gathers software-related diagnostic information related to the error and sends the software-related diagnostic information to the storage system. Meanwhile, the storage system gathers hardware-related diagnostic information related to the error. Once the storage system obtains both software-related diagnostic information and hardware-related diagnostic information, the storage system bundles the information together and sends it to a service provider using a "call home" function.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
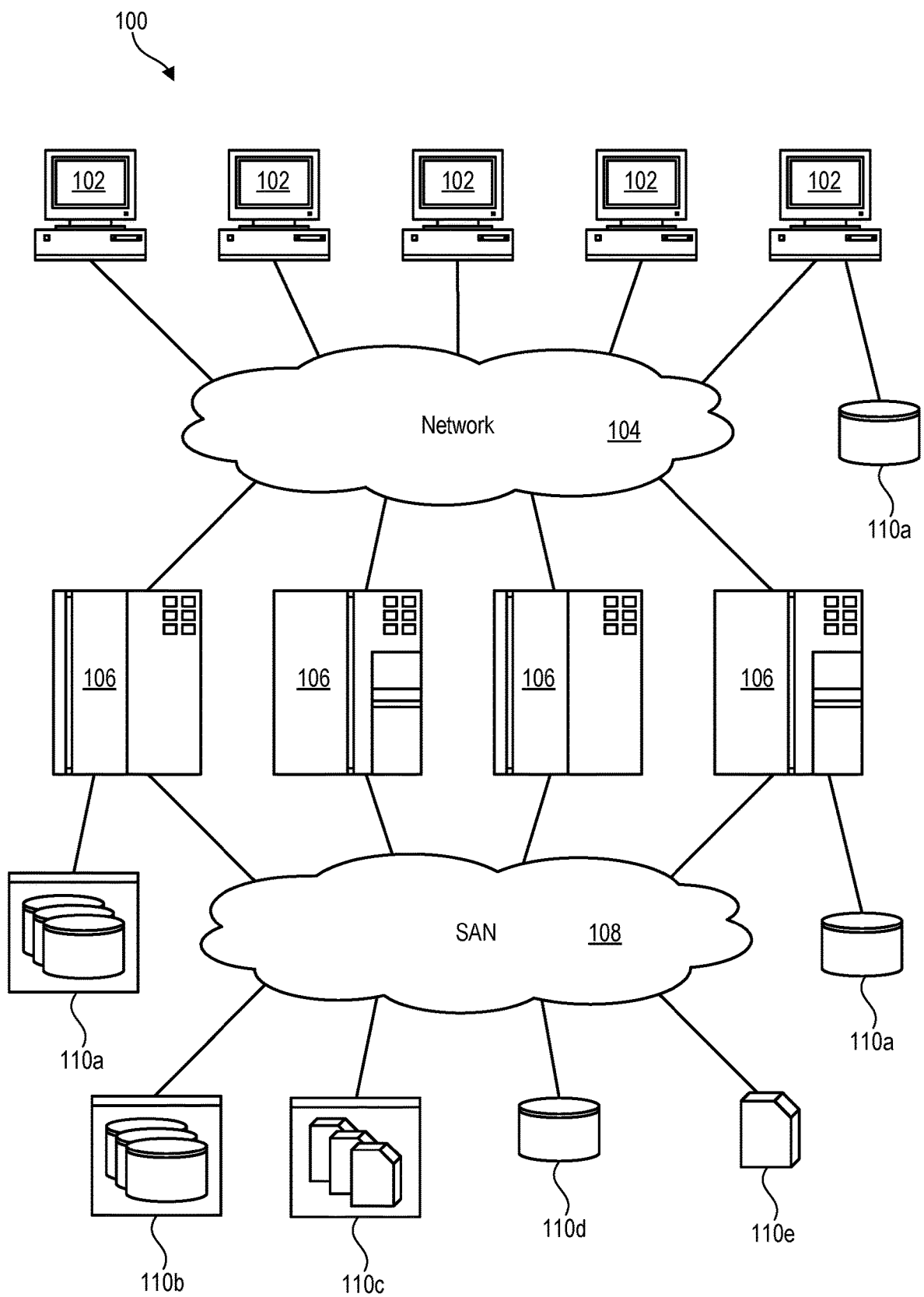
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
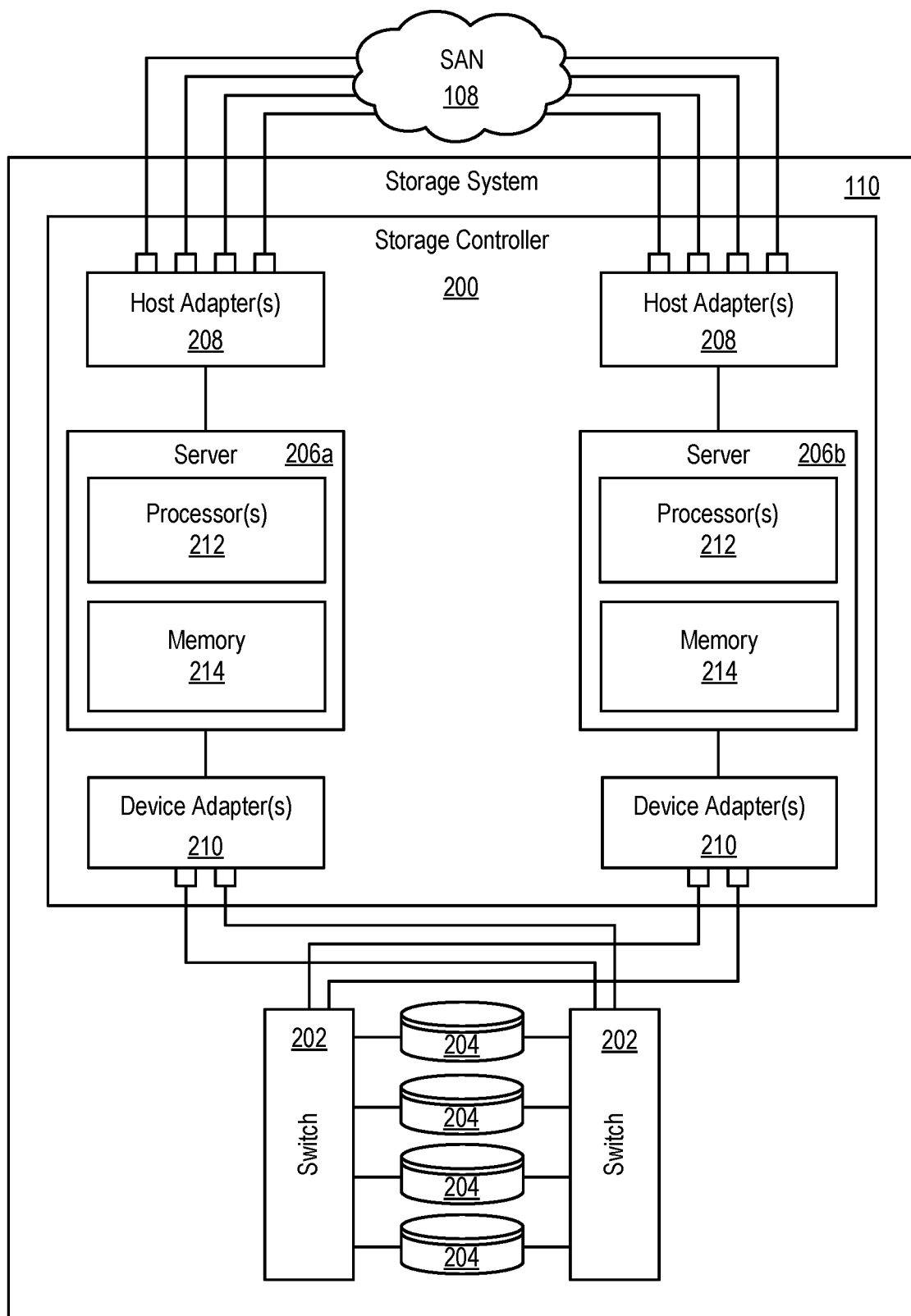
FIG. 2 is a high-level block diagram showing one example of a storage system that may include a "call home" function.

Referring to FIG. 2, one embodiment of a storage system 110 containing an array of hard-disk drives 204 and/or solid-state drives 204 is illustrated. Such a storage system may be used to implement various aspects of the invention, including the "call home" feature previously described. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
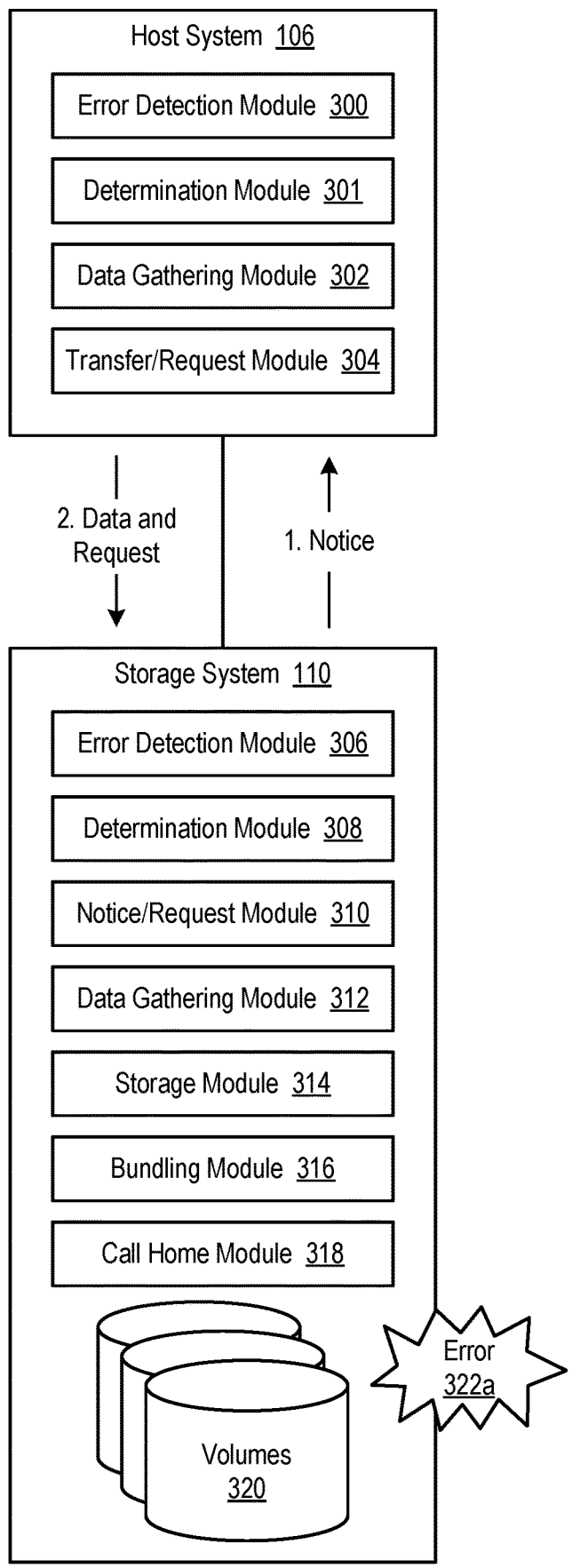
FIGS. 3 and 4 are high-level block diagrams showing modules for implementing different functionality in accordance with the invention.

Referring to FIG. 3, as previously mentioned, it is important for service providers such as in-house technicians and third-party service personnel to be alerted when problems or issues arise with storage systems 110 that store data. For this reason, some storage system vendors have developed notification systems to notify service providers when problems or issues occur. For example, IBM storage systems such as IBM San Volume Controller (SVC) and IBM Storwize have a "call home" feature that generates and sends a message to a service provider when a problem or issue occurs on a storage system 110. These messages may contain detailed information about a problem such as a system log providing context to the problem, time and date the problem occurred, and type of problem that was detected.

Unfortunately, some errors may require gathering diagnostic information not only from a storage system 110, but also from a host system 106 that accesses data on the storage system 110. The "call home" feature discussed above, while effective to communicate hardware-related diagnostic information to a service provider, may not have the capability to communicate software-related diagnostic information (from a host system 106) to the service provider. Systems and methods in accordance with the invention may enable information to be collected on both the host system 106 and storage system 110 and communicate this information together to a service provider. As will be explained in more detail hereafter, such systems and methods may utilize the "call home" feature of the storage system 110 to communicate this information to the service provider.

In order to provide the various features and functions of the invention described above, the host system 106 and storage system 110 may be configured with one or more modules. These modules may be implemented in hardware, software, firmware, or combinations thereof. The modules illustrated in FIG. 3 are presented by way of example and not limitation. The host system 106 and/or storage system 110 may include more or fewer modules than those illustrated, or the functionality of the modules may be combined or split into additional modules as needed.

As shown, the host system 106 may include one or more of an error detection module 300, determination module 301, data gathering module 302, and transfer/request module 304. The storage system 110 may include one or more of an error detection module 306, determination module 308, notice/request module 310, data gathering module 312, storage module 314, bundling module 316, and call home module 318.

FIG. 3 shows a scenario where an error 322a occurs at the storage system 110. In such a scenario, the error detection module 306 at the storage system 110 may detect the error 322a and the determination module 308 may determine if the error condition requires diagnostic data gathering on the host system 106. If so, the notice/request module 310 notifies the host system 106 of the hardware-related error condition 322a at the storage system 110 and the need to gather software-related diagnostic information at the host system 106. The host system 106 may receive this notification and invoke its data gathering module 302 to gather software-related diagnostic information at the host system 106. The transfer/request module 304 may transmit this software-related diagnostic information to the storage system 110. In certain embodiments, the host system 106 may transmit the software-related diagnostic information to the storage system 110 in one or more Channel Command Words (CCWs) sent over a channel program. In certain embodiments, these CCWs may be a new type of CCW that indicate to the storage system 110 that the information contained therein needs to be stored and collected at the storage system 110.

The storage system 110 may receive the software-related diagnostic information from the host system 106 and the storage module 314 may store it on the storage system 110 (such as in memory 214 or the volumes 320). Meanwhile, the data gathering module 312 on the storage system 110 may gather hardware-related diagnostic information related to the error condition 322a. Once the storage system 110 obtains both hardware-related diagnostic information from the storage system 110 and software-related diagnostic information from the host system 106, the bundling module 316 may bundle the information together and the call home module 318 may communicate the information from the storage system 110 to a service provider. In this way, the service provider may receive diagnostic information from both the host system 106 and storage system 110 so that the root cause of the error 322a may be determined. Beneficially, the software-related diagnostic information and hardware-related diagnostic information may be gathered at substantially the same time due to the automated initiation of data gathering functions on both the storage system 110 and host system 106.

Figure 4:
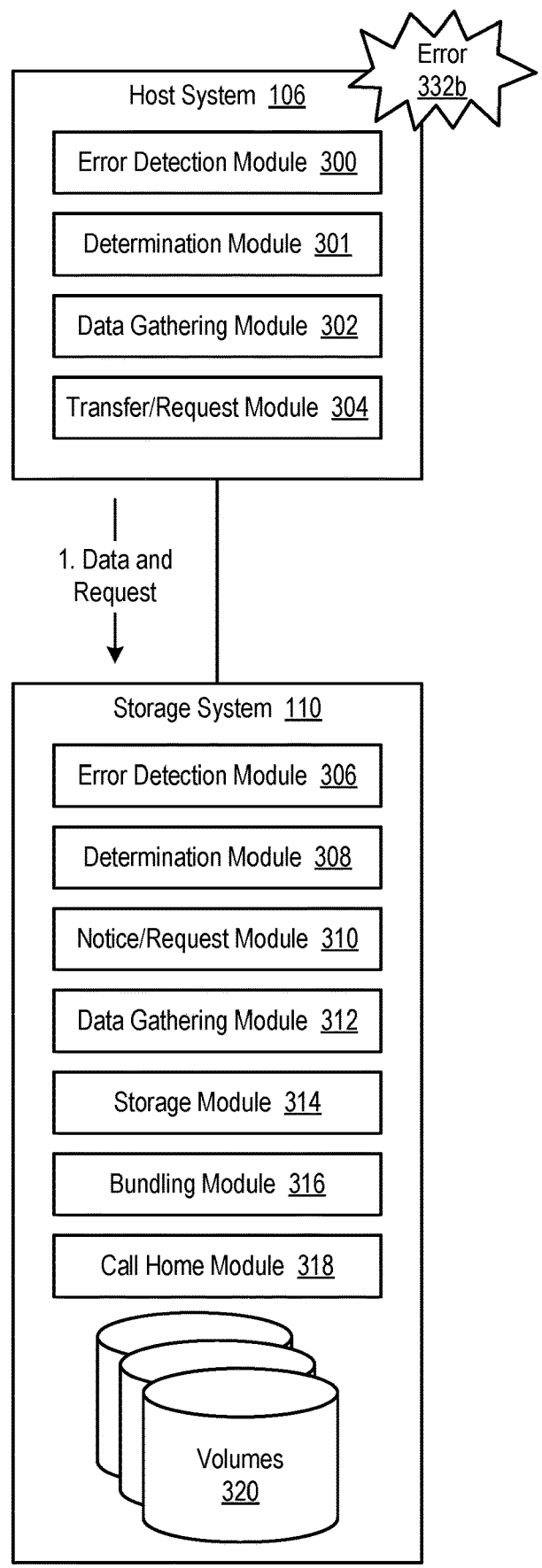

FIG. 4 shows an alternative scenario where an error 322b occurs at the host system 106. In such a scenario, the error detection module 300 at the host system 106 detects the error condition 322b and the data gathering module 302 gathers software-related diagnostic information related to the error 322b at the host system 106. Meanwhile, the determination module 301 determines whether the error condition 322b requires additional diagnostic information gathering at the storage system 110. If so, the transfer/request module 304 transfers the software-related diagnostic information to the storage system 110 (e.g., by way of one or more CCWs) and transmits a request to the storage system 110 to gather hardware-related diagnostic information.

The storage system 110 receives the software-related diagnostic information and the request to gather hardware-related diagnostic information. In response, the storage module 314 saves the software-related diagnostic information and the data gathering module 312 gathers the hardware-related diagnostic information at the storage system 110. Once the storage system 110 has obtained both hardware-related diagnostic information from the storage system 110 and software-related diagnostic information from the host system 106, the bundling module 316 bundles the information together and the call home module 318 communicates the bundled information to a service provider.

Figure 5:
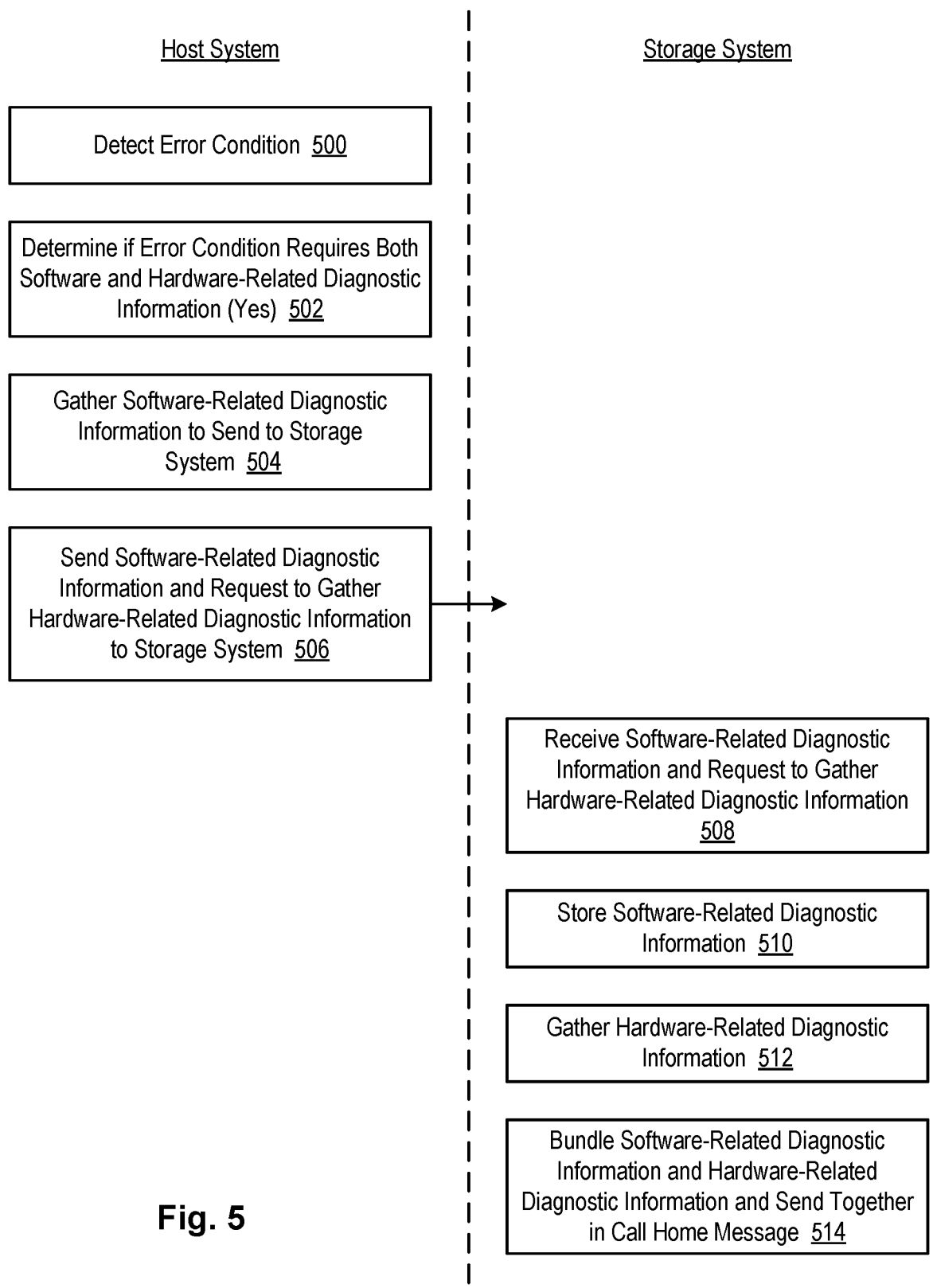
FIG. 5 is a high-level block diagram showing a first scenario for collecting diagnostic information associated with an error.
Figure 6:
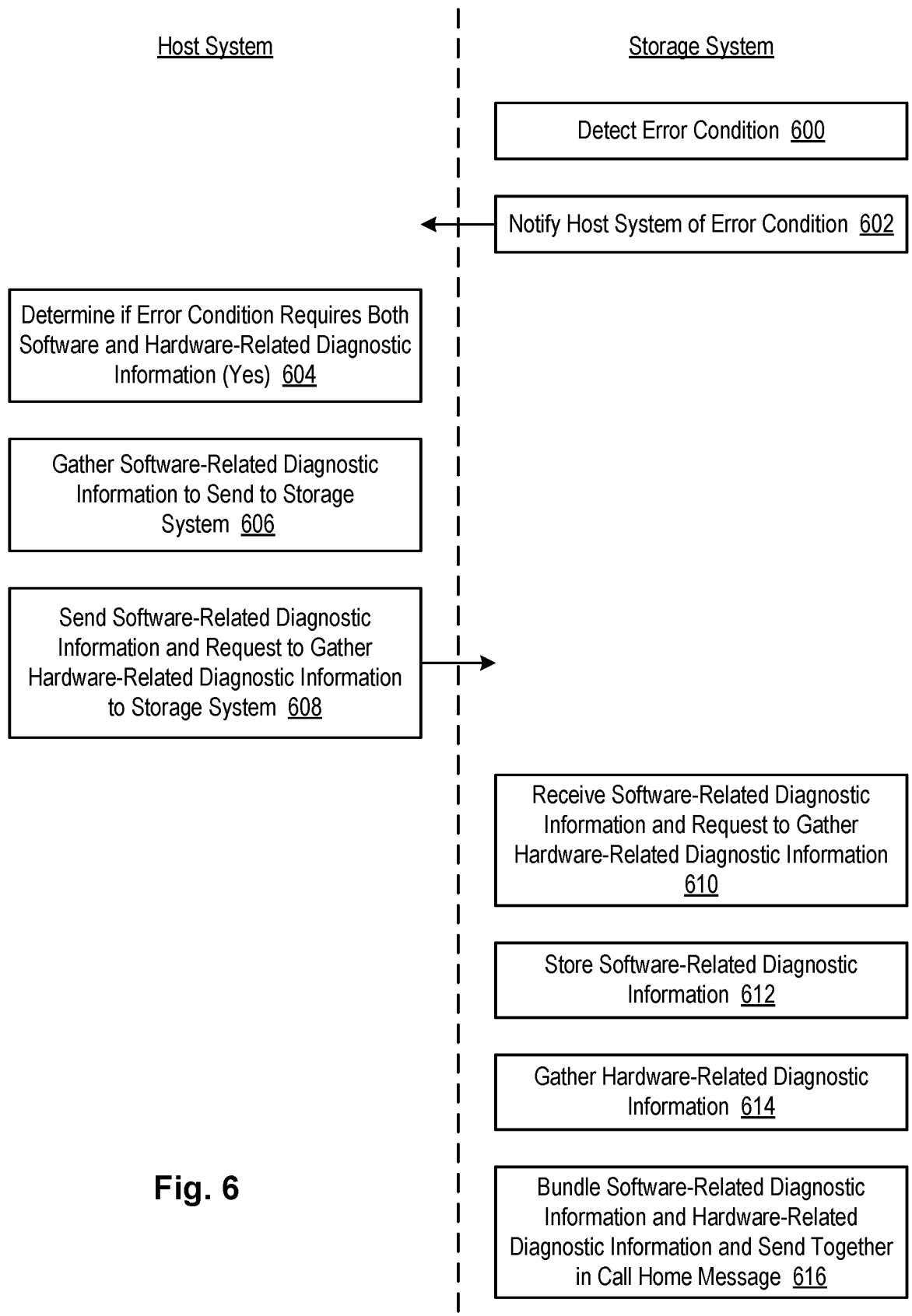
FIG. 6 is a high-level block diagram showing a second scenario for collecting diagnostic information associated with an error.
Figure 7:
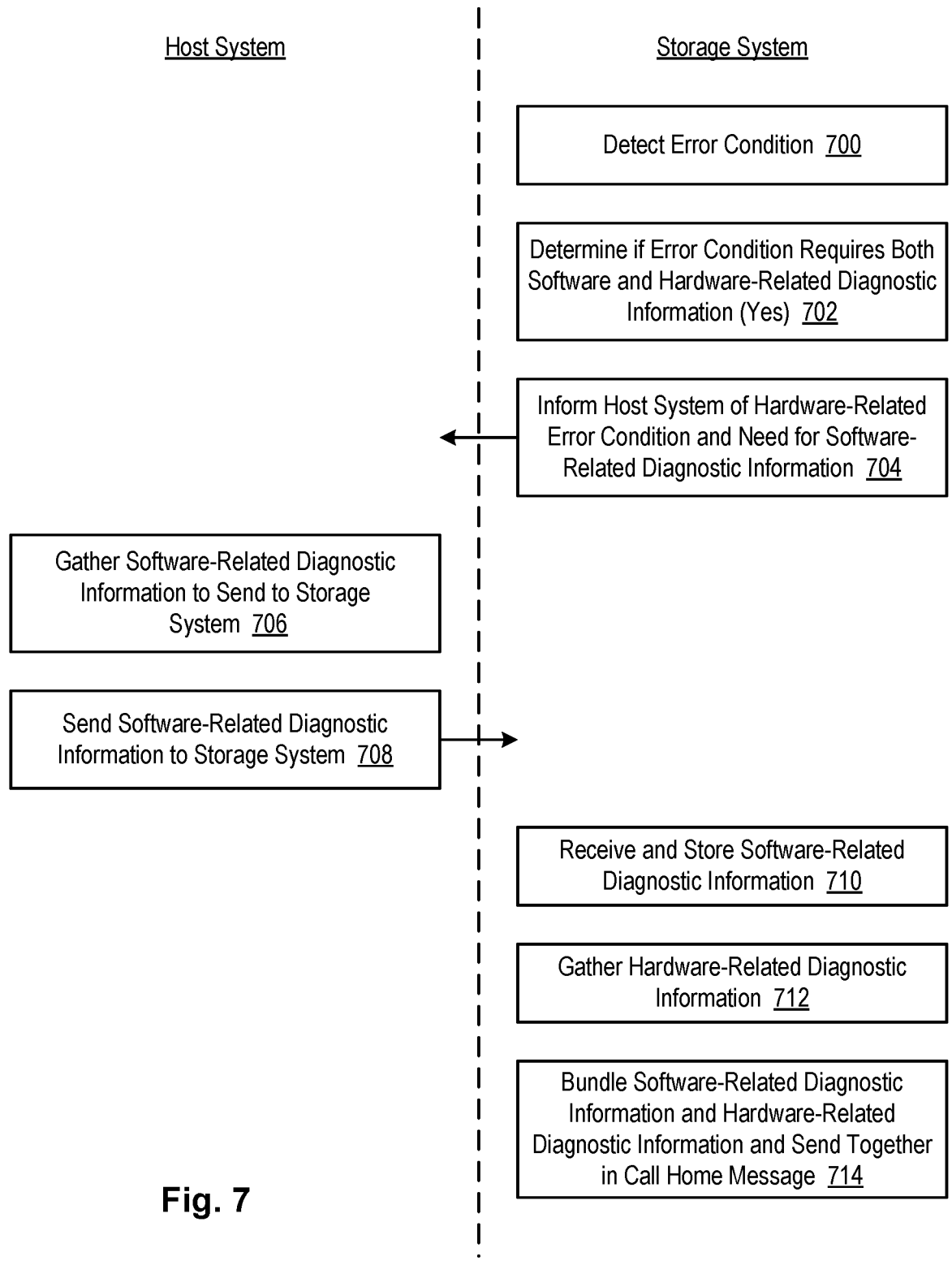
FIG. 7 is a high-level block diagram showing a third scenario for collecting diagnostic information associated with an error.

FIGS. 5 through 7 show various possible scenarios for communicating software-related diagnostic information and hardware-related diagnostic information to a service provider. The scenarios show how errors 322 occurring or detected on either the host system 106 or storage system 110 may be used to trigger diagnostic information collection in both systems 106, 110. The scenarios are exemplary in nature and are not intended to represent an exclusive set of possible scenarios that may benefit from systems and methods in accordance with the invention. Various steps from the scenarios may be combined to create new potential scenarios or steps may be deleted or added as needed. In addition, the steps presented in the various scenarios may be performed in different orders or with different timings than what is illustrated or described.

FIG. 5 shows a first scenario wherein an error condition 322 is detected 500 at the host system 106. As shown, the host system 106 determines 502 if the error condition 322 requires both software- and hardware-related diagnostic information. For example, an error 322b may be hardware-related if it involves an I/O timeout. If the error condition 322b does require hardware-related diagnostic information, the host system 106 gathers 504 software-related diagnostic information (such as session names, unit control blocks (UCBs), software error codes, information on coupled sessions, timing of diagnostic information, etc.) and sends 506 the software-related diagnostic information to the storage system 110. In addition, the host system 106 sends 506 a request to the storage system 110 to gather hardware-related diagnostic information (such as statesave or on-demand-dump data) associated with the error 322.

The storage system 110 receives 508 the software-related diagnostic information and the request to gather hardware-related diagnostic information. In response, the storage system 110 stores 510 the software-related diagnostic information and gathers 512 the hardware-related diagnostic information (using, for example, hardware state saves, on-demand dumps, etc.). Once the storage system 110 has obtained both the software-related diagnostic information and the hardware-related diagnostic information, the storage system 110 bundles 514 the information together and sends 514 it to a service provider by way of a call home message.

FIG. 6 shows a second scenario wherein an error condition 322 is detected 600 at the storage system 110 as opposed to the host system 106. In response, the storage system 110 notifies 602 the host system 106 of the error condition 322b. At this point, the host system 106 determines 604 if the error condition 322 requires both software- and hardware-related diagnostic information. If so, the host system 106 gathers 606 software-related diagnostic information and sends 608, to the storage system 110, the software-related diagnostic information along with a request to gather hardware-related diagnostic information.

The storage system 110 receives 610 the software-related diagnostic information and the request. In response, the storage system 110 stores 612 the software-related diagnostic information on the storage system 110 and gathers 614 the hardware-related diagnostic information in accordance with the request. Once the storage system 110 obtains both the software-related diagnostic information and the hardware-related diagnostic information, the storage system 110 bundles 616 the information together and sends 616 it to a service provider by way of a call home message.

FIG. 7 shows a third scenario wherein an error condition 322 is also detected 700 at the storage system 110. In response, the storage system 110 determines 702 whether the error condition 322 requires both software- and hardware-related diagnostic information. If so, the storage system 110 informs the host system 106 of the error condition 322b and the need for software-related diagnostic information. This communication may be embodied as a request for software-related diagnostic information or the host system 106 may interpret the notice as a request for such. Alternatively, the host system 106 may be informed of the error 322b by reading diagnostic or error information on the storage system 110.

In response to the notice/request, the host system 106 gathers 706 the software-related diagnostic information and sends 708 this information to the storage system 110. The storage system 110 receives 710 and stores 710 the software-related diagnostic information. The storage system 110 also gathers 712 hardware-related diagnostic information associated with the error 322. Once the storage system 110 possesses both the software-related diagnostic information and the hardware-related diagnostic information, the storage system 110 bundles 714 the information together and sends 714 it to a service provider by way of a call home message.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for collecting diagnostic information associated with an error, the method comprising:
   detecting an error at a storage system;
   determining, by the storage system, whether software-related diagnostic information is needed from a host system to diagnose the error;
   in the event the software-related diagnostic information is needed from the host system, notifying, by the storage system, the host system of the need for the software-related diagnostic information;
   gathering, by the host system in response to the notification, software-related diagnostic information related to the error;
   sending, from the host system to the storage system, the software-related diagnostic information;
   gathering, at the storage system, hardware-related diagnostic information related to the error; and
   bundling, at the storage system, the software-related diagnostic information and hardware-related diagnostic information and sending the bundled information to a service provider, external to the host system and the storage system, using a "call home" function of the storage system.

2. The method of claim 1, further comprising saving, at the storage system, the software-related diagnostic information.

3. The method of claim 1, wherein the notification is embodied as a request for the software-related diagnostic information.

4. The method of claim 1, wherein gathering the software-related diagnostic information and gathering the hardware-related diagnostic information occurs at substantially the same time.

5. The method of claim 1, wherein gathering the software-related diagnostic information and gathering the hardware-related diagnostic information occurs immediately upon detecting the error.

6. The method of claim 1, wherein the software-related diagnostic information and hardware-related diagnostic information comprise at least one of state-save information, trace information, and dump information.

7. The method of claim 1, wherein sending the software-related diagnostic information comprises sending the software-related diagnostic information in at least one Channel Command Word.

8. A computer program product for collecting diagnostic information associated with an error, the computer program product comprising a non-transitory computer-readable storage medium having computer-usable program code embodied therein, the computer-usable program code configured to perform the following when executed by at least one processor:
   detect an error at a storage system;
   determine, by the storage system, whether software-related diagnostic information is needed from a host system to diagnose the error;
   in the event the software-related diagnostic information is needed from the host system, notify, by the storage system, the host system of the need for the software-related diagnostic information;
   gather, by the host system in response to the notification, software-related diagnostic information related to the error;
   send, from the host system to the storage system, the software-related diagnostic information;
   gather, at the storage system, hardware-related diagnostic information related to the error; and
   bundle, at the storage system, the software-related diagnostic information and hardware-related diagnostic information and sending the bundled information to a service provider, external to the host system and the storage system, using a "call home" function of the storage system.

9. The computer program product of claim 8, wherein the computer-usable program code is further configured to save, at the storage system, the software-related diagnostic information.

10. The computer program product of claim 8, wherein the notification is embodied as a request for the software-related diagnostic information.

11. The computer program product of claim 8, wherein gathering the software-related diagnostic information and gathering the hardware-related diagnostic information occurs at substantially the same time.

12. The computer program product of claim 8, wherein gathering the software-related diagnostic information and gathering the hardware-related diagnostic information occurs immediately upon detecting the error.

13. The computer program product of claim 8, wherein the software-related diagnostic information and hardware-related diagnostic information comprise at least one of state-save information, trace information, and dump information.

14. The computer program product of claim 8, wherein sending the software-related diagnostic information comprises sending the software-related diagnostic information in at least one Channel Command Word.

15. A system for collecting diagnostic information associated with an error, the system comprising:
   at least one processor;
   at least one memory device operably coupled to the at least one processor and storing instructions for execution on the at least one processor, the instructions causing the at least one processor to:
   detect an error at a storage system;
   determine, by the storage system, whether software-related diagnostic information is needed from a host system to diagnose the error;

in the event the software-related diagnostic information is needed from the host system, notify, by the storage system, the host system of the need for the software-related diagnostic information;

gather, by the host system in response to the notification, software-related diagnostic information related to the error;

send, from the host system to the storage system, the software-related diagnostic information;

gather, at the storage system, hardware-related diagnostic information related to the error; and bundle, at the storage system, the software-related diagnostic information and hardware-related diagnostic information and sending the bundled information to a service provider, external to the host system and the storage system, using a "call home" function of the storage system.

16. The system of claim 15, wherein the instructions further cause the at least one processor to save, at the storage system, the software-related diagnostic information.

17. The system of claim 15, wherein the notification is embodied as a request for the software-related diagnostic information.

18. The system of claim 15, wherein gathering the software-related diagnostic information and gathering the hardware-related diagnostic information occurs at substantially the same time.

19. The system of claim 15, wherein gathering the software-related diagnostic information and gathering the hardware-related diagnostic information occurs immediately upon detecting the error.

20. The system of claim 15, wherein sending the software-related diagnostic information comprises sending the software-related diagnostic information in at least one Channel Command Word.

* * * * *